Sept. 30, 1958
C. L. COPELAND
2,854,158
SYSTEM FOR LOADING AND UNLOADING OF
TRUCK-TRAILERS AND RAILROAD CARS
Filed Oct. 18, 1956
10 Sheets-Sheet 1
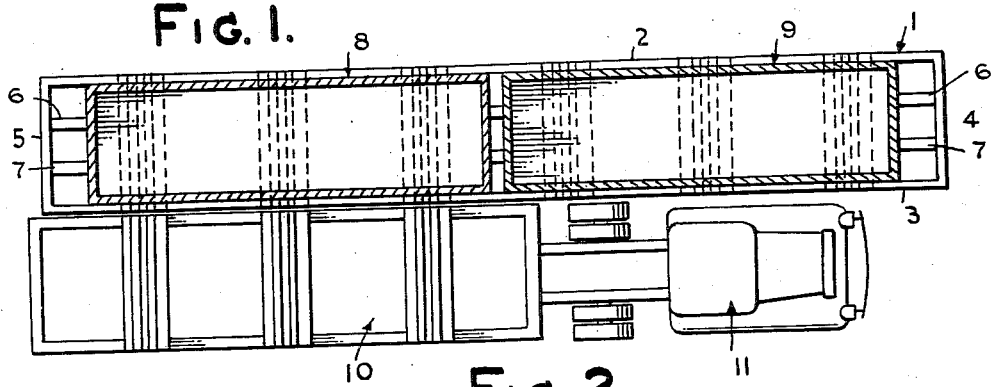
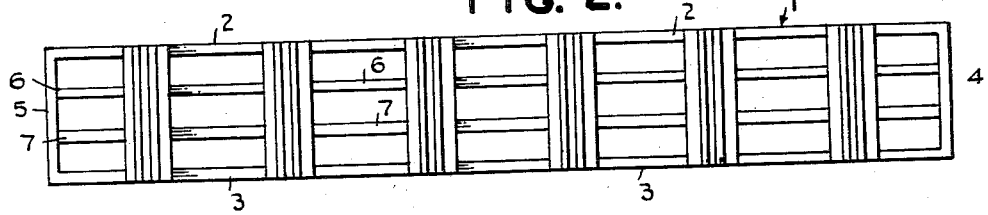
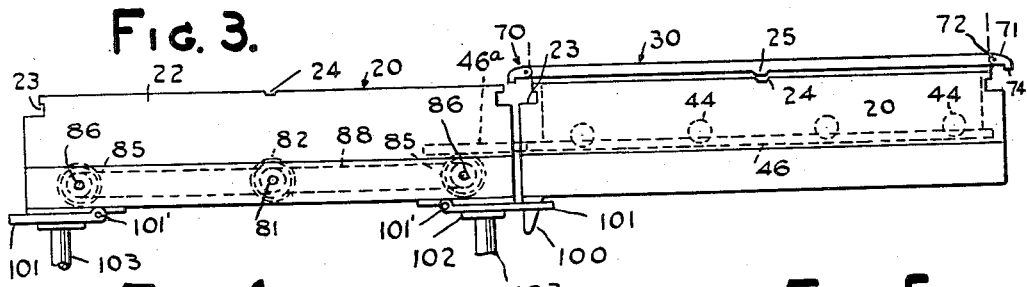
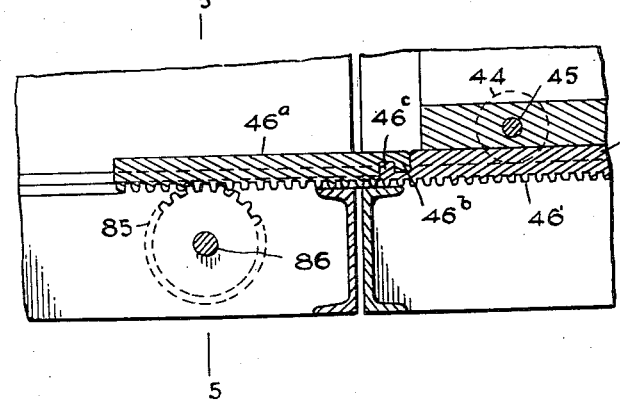
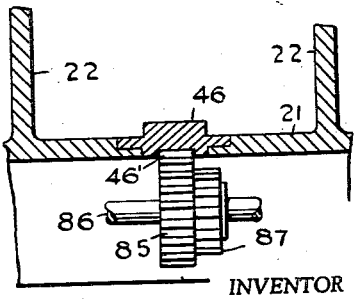
INVENTOR
CLAUDE L. COPELAND
BY
ATTORNEY Sept. 30, 1958 C. L. COPELAND 2,854,158
SYSTEM FOR LOADING AND UNLOADING OF
TRUCK-TRAILERS AND RAILROAD CARS
Filed Oct. 18, 1956 10 Sheets-Sheet 2
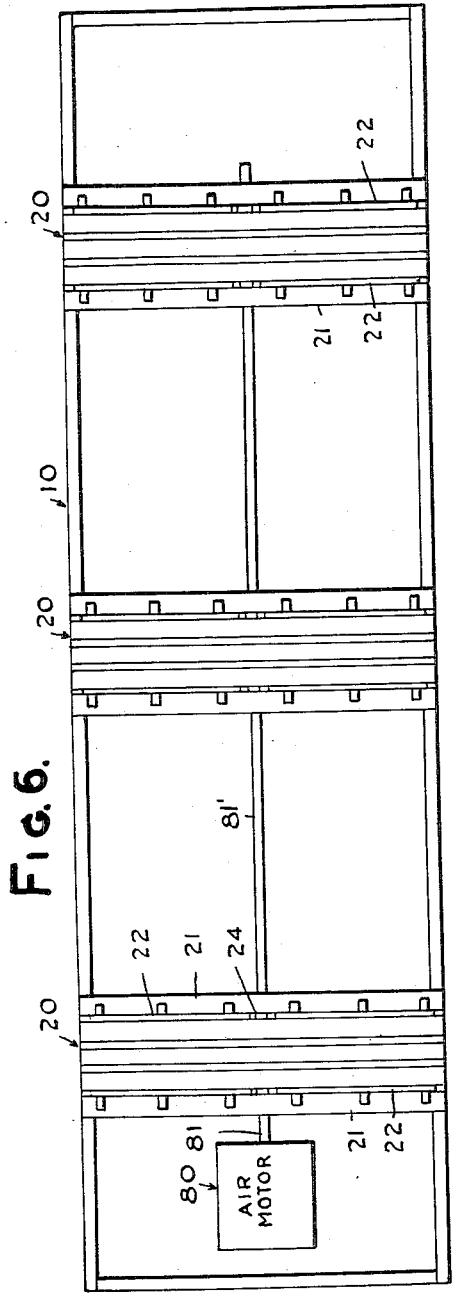
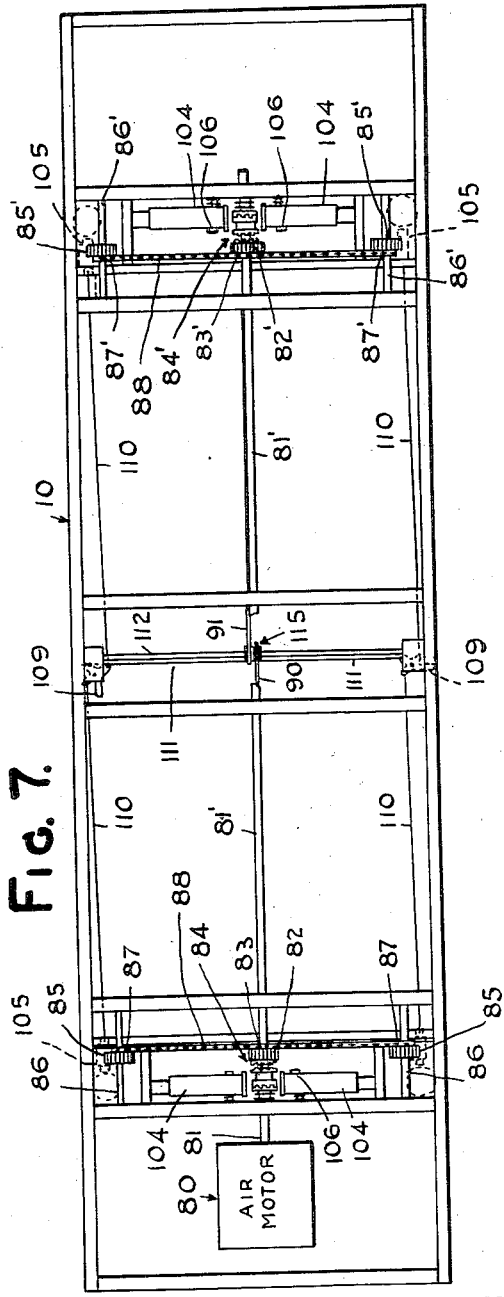
INVENTOR
CLAUDE L. COPELAND
BY
ATTORNEY

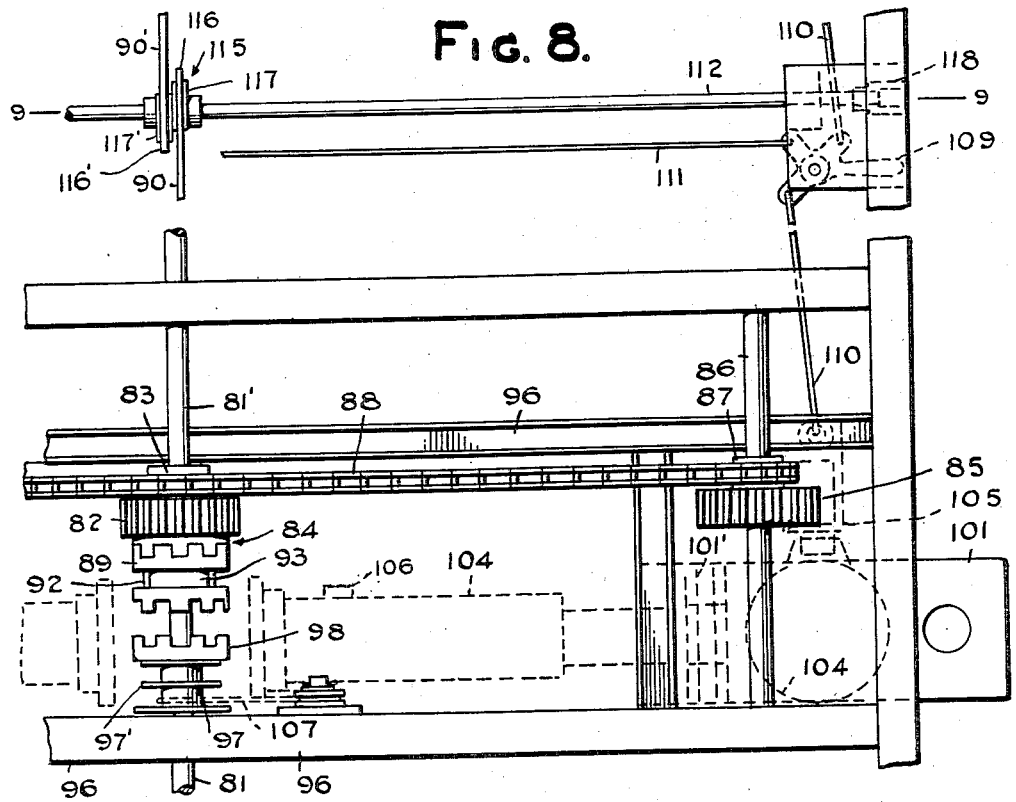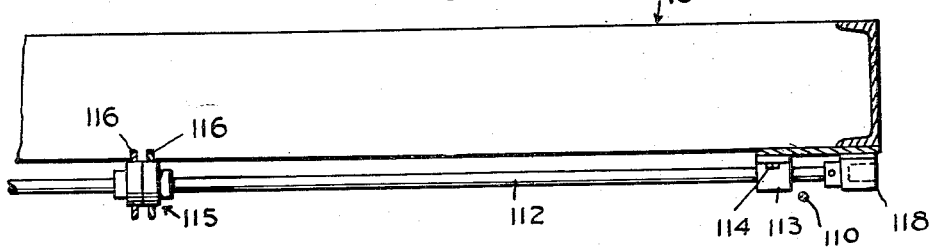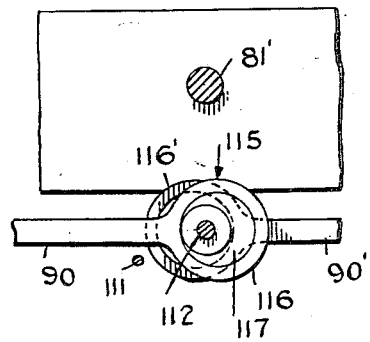

Sept. 30, 1958 C. L. COPELAND 2,854,158
SYSTEM FOR LOADING AND UNLOADING OF
TRUCK-TRAILERS AND RAILROAD CARS
Filed Oct. 18, 1956 10 Sheets-Sheet 4

INVENTOR.
CLAUDE L. COPELAND
BY
ATTORNEY

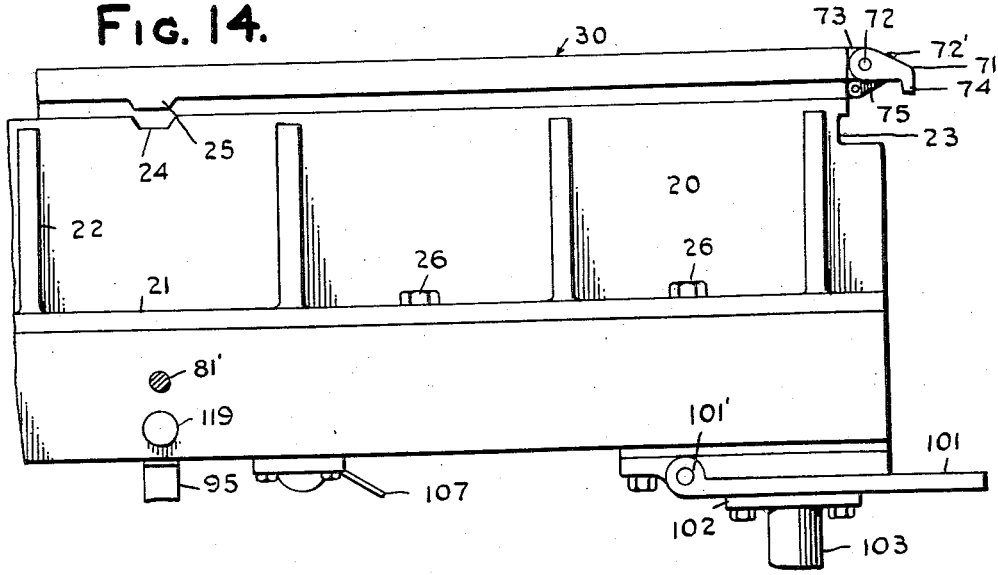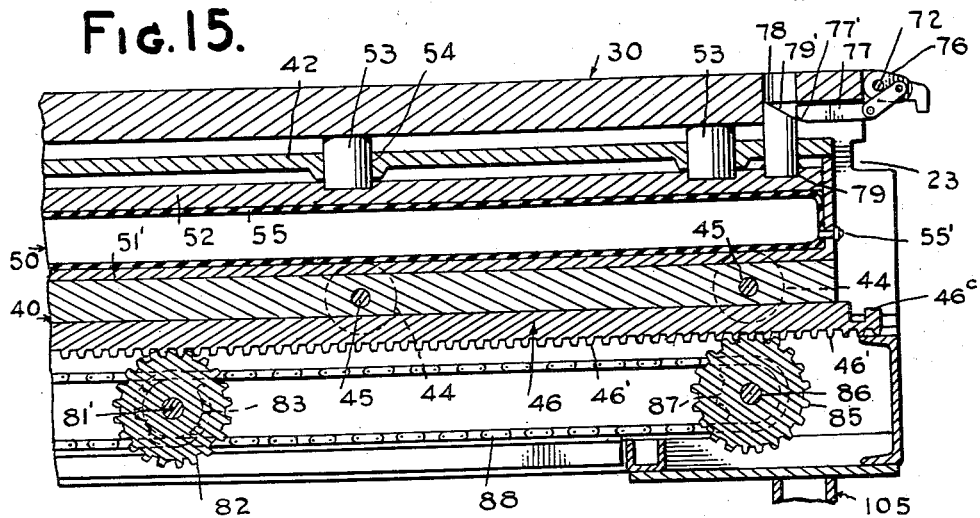

Sept. 30, 1958 
C. L. COPELAND
2,854,158
SYSTEM FOR LOADING AND UNLOADING OF
TRUCK-TRAILERS AND RAILROAD CARS Filed Oct. 18, 1956
10 Sheets-Sheet 6

INVENTOR.
CLAUDE L. COPELAND
BY
ATTORNEY

Sept. 30, 1958 C. L. COPELAND 2,854,158
SYSTEM FOR LOADING AND UNLOADING OF
TRUCK-TRAILERS AND RAILROAD CARS
Filed Oct. 18, 1956 10 Sheets-Sheet 7

INVENTOR.
CLAUDE L. COPELAND
BY
ATTORNEY

INVENTOR
CLAUDE L. COPELAND

BY
ATTORNEY

Sept. 30, 1958 C. L. COPELAND 2,854,158
SYSTEM FOR LOADING AND UNLOADING OF
TRUCK-TRAILERS AND RAILROAD CARS
Filed Oct. 18, 1956 10 Sheets-Sheet 9

INVENTOR
CLAUDE L. COPELAND

BY *Gardner J. O'Boyle*
ATTORNEY

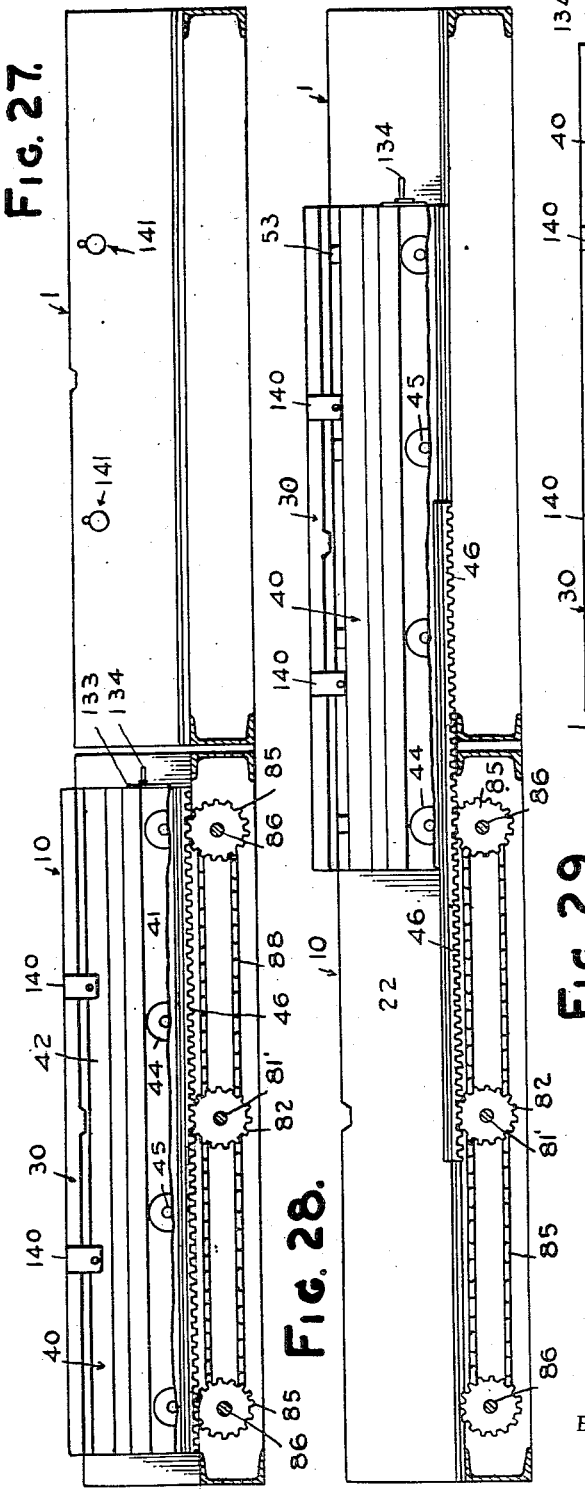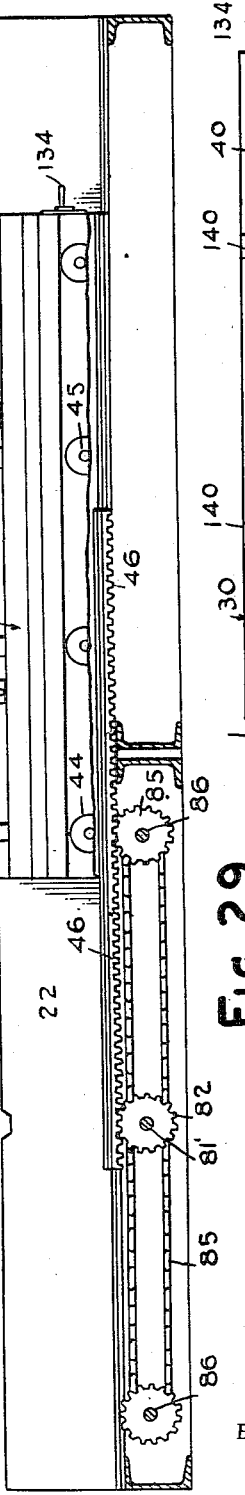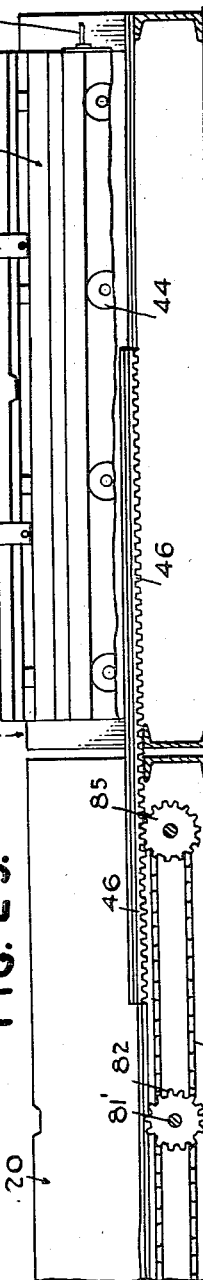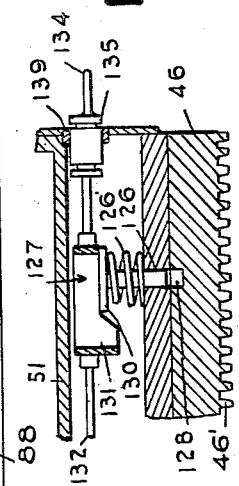

United States Patent Office 2,854,158
Patented Sept. 30, 1958

2,854,158

SYSTEM FOR LOADING AND UNLOADING OF TRUCK-TRAILERS AND RAILROAD CARS

Claude L. Copeland, Pittsburgh, Pa.

Application October 18, 1956, Serial No. 616,787

21 Claims. (Cl. 214—38)

This invention relates to novel transportation systems for shipping containers, and more particularly, to a novel system for loading and unloading freight containers on and from freight cars, and transferring the same to and from trucks and trailers. Additionally, the invention is directed to special equipment features adapted for use with standard railroad cars and carriers such as trucks, trailers, and the like.

The development of LCL freight units (less-than-carload lots) has usually been restricted to relatively small units, usually six to a flat car or gondola, and which are handled by small cranes permanently installed at railroad yards. Substantially no attempt has been made to improve the facilities for handling large size containers, extra long containers or loads, such as telephone poles and automobile carrier trailer loads, which are too long for half a car, and too short for a full car load. Also, extra long loads, such as bridge girders, cannot be conveniently handled by presently available equipment.

The above-recited disadvantages of the prior art are essentially overcome by the improvements of the present invention, which convert LCL containers of various sizes, loading bridles for girders, pipes, poles, etc., into mobile units adapted to be readily transferred from carrier vehicles to railroad cars, and vice versa. The novel improvements, as will appear more fully hereinafter, essentially comprise transversely disposed male rail members secured to the floors of railroad cars and carrier vehicles, and cooperating female supporting members secured to and supporting a superposed load or container. The male and female members are split to receive wheeled transfer carriages adapted to transfer a unit load from one vehicle to another. The transfer carriages are desirably included as a part of the equipment of the carrier vehicle. The carrier vehicles incorporate means for adjusting their floor levels to the levels of the railroad cars, and means are provided for interlocking engagement of the carrier vehicles with railroad cars to which they are apposed.

The present invention is an improvement of the system described in my application Ser. No. 508,844, filed May 17, 1955, for System for Loading and Unloading of Truck Trailers and Railroad Cars. In the aforesaid application, the power means for moving loads to or from the railway car or carrier vehicle, comprises a winch and cable system carried by the trailer truck. While this system functions satisfactorily, I have found that a direct drive between the roll-away means upon which the load is supported, and a power supply associated with the carrier vehicle, is more efficient and practicable than the winch and cable arrangement.

In accordance with one form of the present invention, a rack is fixedly attached to the base of each dolly, the rack being positioned centrally of the base and extending the full length of the dolly. The bottom member of the channel shaped lower rail is formed with a longitudinal slot to accommodate the rack for free sliding movement with respect to the rail, the teeth of the rack being adapted for meshing engagement with suitable pinions attached to a power shaft, mounted on the carrier vehicle. Suitable clutch means, also mounted on the carrier vehicle, are provided for reversing the direction of movement of the dollies during the loading or unloading operations.

In the above described form of the present invention, when the load carrying dollies are being transferred from the carrier vehicle to the railway car, for example, means are provided, in the form of short rack members adapted to be coupled to the outer ends of the racks attached to the bases of the dollies, whereby the dollies may be moved to the full loading position on the car. In this connection, it will be appreciated, that as a dolly moves from the carrier vehicle on to the railway car the fixed rack runs off the last pinion, just before the dolly clears the side or edge of the trailer adjacent the railway car. Accordingly, by means of the rack extensions, further movement of the dollies to full loading position on the car is effected. In like fashion, the auxiliary racks may be used to initiate withdrawal of a dolly from the car, after the load is supported on the lower rails attached to the floor or framing of the railway car.

In another form of the present invention, a modified rack arrangement is provided for moving the dollies to or from a trailer or railway car. In this modification, the racks associated with the dollies are constructed and arranged whereby they may be extended outwardly from the bases of the dollies, so as to operatively engage with the pinions which normally would clear the racks before the dollies reach full loading position on the car, as explained hereinabove. Instead of being fixedly attached to the dollies, the racks are arranged for free movement with respect to the bases of the dollies, and means are provided to release the racks from connection with the dollies to permit such movement, through the medium of the power driven pinions.

An object of this invention is to provide a novel transfer and transportation system for less-than-carload lot freight shipments.

Another object of this invention is to provide a system of the character described which is adapted for incorporation in standard railroad cars and carrier vehicles without requiring alteration of the basic structures thereof.

Still another object of this invention is to provide a transverse, interlocking rail system for use in the transfer of unit loads from a railroad car to a carrier vehicle, and vice versa.

Yet another object of this invention is to provide means for the mutual alignment and interlocking of a carrier vehicle with a railroad car to provide means for the mechanical transfer of a unit load from one to the other.

A further object of this invention is to provide load carrier and transfer means severally secured to a railroad car and a unit load, and optionally operable to fixedly support the load on the car or lift it to a transfer position, and to provide wheeled transfer elements operable to support the load when it is lifted to a transfer position.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings, like numerals refer to similar parts throughout the several views, of which Figure 1 is a top plan view of a railroad flat car loaded with two loads mounted on equally spaced load-supporting rails, a trailer chassis juxtaposed to one load, and a trailer truck;

Fig. 2 is a top plan view of the railroad flat car shown in Fig. 1;

Fig. 3 is an end view showing the aligned floorings (docks) of the flat car and the truck, with load supporting carriage transferred to the railway car;

Fig. 4 is a detail sectional view showing rack extension;

Fig. 5 is a sectional view on line 5—5 of Fig. 4;

Fig. 6 is a top plan view of a trailer, showing the trackways for load carrying carriages on dollies;

Fig. 7 is a top plan view of the trailer, showing operating means for moving the carriages from the trailer to the railway car, or vice versa;

Fig. 8 is an enlarged plan view of the right-hand end of the trailer of Fig. 7, showing the clutch arrangement for the cariage drive means, and for lifting the leveling jacks;

Fig. 9 is a sectional view on line 9—9 of Fig. 8, showing the clutch shifting means;

Fig. 10 is a detail sectional view showing the cam arrangement for shifting the clutches at opposite ends of the trailer;

Fig. 11 is a detail view of the leveling jack releasing means;

Figs. 14 and 15 are views similar to Figs. 12 and 13, showing the carriage in unlocked position on the trailer rails;

Fig. 27 is a side view of a carriage on the trailer in position to be transferred to a railway car;

Fig. 28 shows the carriage of Fig. 27 in an intermediate position during its transfer to the railway car;

Fig. 29 shows the carriage in place on the railway car; and

Fig. 30 is an enlarged detail view of the rack locking and releasing means.

Figure 12:
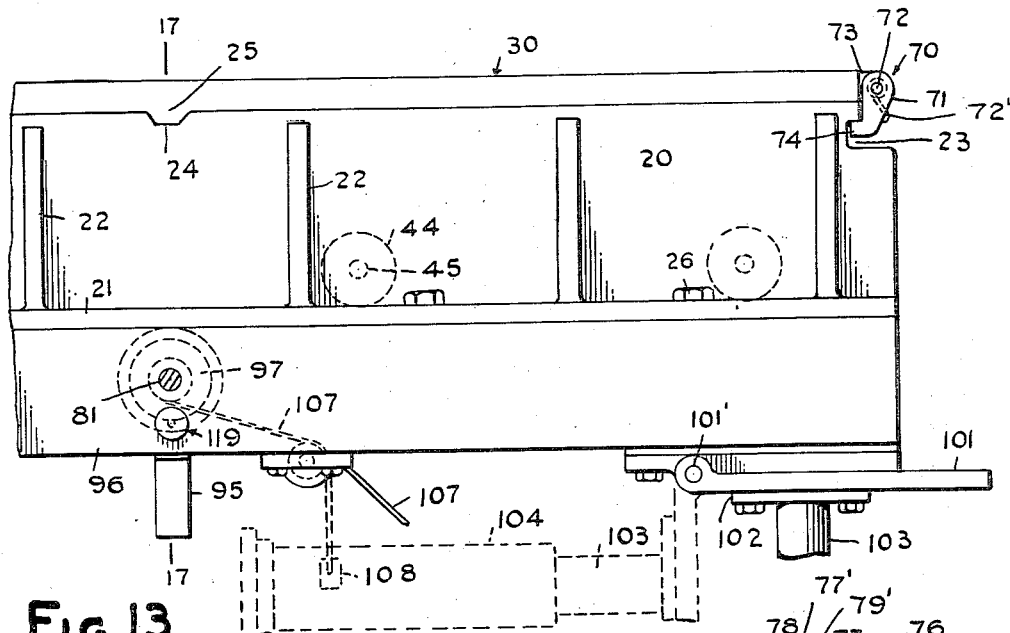
Fig. 12 is an enlarged side view of a carriage, showing the carriage in locked position on the trailer rails.

Referring to the drawings, and more particularly to Figs 1 and 2, there is indicated generally, a flat railway car 1, having spaced sides 2, 3, ends 4, 5, and longitudinal struts 6, 7, between the side members. In the loading arrangement shown in Fig. 1, a pair of uniformly sized containers 8, 9 are mounted on the flat car, and substantially cover the entire upper surface thereof. It will be understood that in lieu of two containers, that a container appreciably larger than a half-length of the car may be loaded thereon.

For the transport of the container units illustrated in Fig. 1, a single trailer hitch 10, may be used, with a power unit or truck 11. If the load consists of extra long containers, telephone poles, bridge girders or the like, a pair of tandem trailer hitches may be used to transport the load.

The rolling transfer of containers from one transport unit to another is made possible by the use of dollies in association with separable, mating rail elements, mounted in spaced relation on both the railroad cars and the trailer hitches, as will be described more in detail hereinafter.

The invention herein is predicated upon the desirability of the direct transfer of LCL containers, of the character described, from one type of transportation unit to another, without requiring loading docks and the incident multiple handling of the containers. As previously noted, the improvements of the present invention are essentially concerned with transfer elements comprising compound rail members which will now be described.

The novel load transfer mechanism herein, Figs. 12–15, comprises a plurality of transversely disposed, uniformly spaced, parallel devices, each of which consists of a fixed base member 20, a superjacent reciprocable load-supporting beam member 30, apposable to member 20, a wheeled load-supporting and carrying member or dolly 40, nested in and between members 20 and 30, and top rail jack or lifting mechanisms 50 incorporated in member 20, selectively operable to seat and unseat member 30 with respect to subjacent base rail member 20, the jacks being normally interlocked with dollies 40, whereby the latter are made integral rolling supports for superposed loads secured on upper rails 30.

To facilitate an understanding of the mutual cooperation of the several elements of the invention, the elements and cooperating fitments will be severally described before proceeding with the consideration of their assembly and function.

The base member 20 is channel shaped, with bilaterally flanged bottom 21 and spaced sides 22, the ends of the sides 22 being recessed to form locking notches 23. Locating sockets 24 are formed in the top edges of side members 22, at approximately the transverse center thereof, said sockets being adapted to receive locating pins or projections 25 of the superposed rail members 30 (Fig. 14). In the form shown, the bases 20 are fixedly secured to a supporting flooring or deck by machine screws or equivalent fastening means 26. The bases may, however, be secured to the support members by welding. The members 20 form restraining, open-ended housings for the elongated dollies or wheeled load carrying members 40, whose wheels or casters 41 are adapted for smooth rolling bearing engagement on the inside surfaces of bottoms 21, the inverted channel frames of the dollies 40 having close clearance with the sides 22 of bases 20, whereby side sway of the dollies is prevented.

The upper, load supporting members 30, are adapted for mating fit engagement on and with the upper surfaces of the sides 22 of base members 20, and are vertically reciprocable into and out of such engagement. These members are constructed and arranged to seat on the top surfaces of the sides 22, and cover the longitudinal opening therebetween. As will appear more fully hereinafter, the load supporting members 30 may serve as permanent base members for superposed load containers, being transferred therewith from one vehicle to another. Where girders, poles, and other oversize items are transported, they may be fixedly attached to the requisite number of supporting members, and the assembly handled as a unit.

An important element of the load transferring mechanism of this invention is the elongated dolly 40, one of which serves as a wheeled load supporting and carrying member for each member 30, and its superjacent load or load container. Each dolly 40 is comprised of an elongated, centrally recessed bottom member 41, and a complementarily recessed top member 42, removably attached to the bottom member by means of machine screws 43, or other suitable fastening means, the central recessed portions of the members forming a tunnel-like opening, when said members are assembled, to receive the jack mechanism 50, to be described more fully hereinafter. The bottom member 41 of each dolly is provided with wheels or casters 44 mounted for rotation on axles 45, positioned in the bottom member, and spaced longitudinally thereof. The bottom portion of member 41 is also formed with a central longitudinal recess to receive a rack member 46, fixedly secured thereto as by welding. The central portion of the bottom of base 21, is recessed (Fig. 17), and formed with an open slot whereby the teeth 46' of the rack are exposed for operative engagement with suitable pinions.

Figure 13:
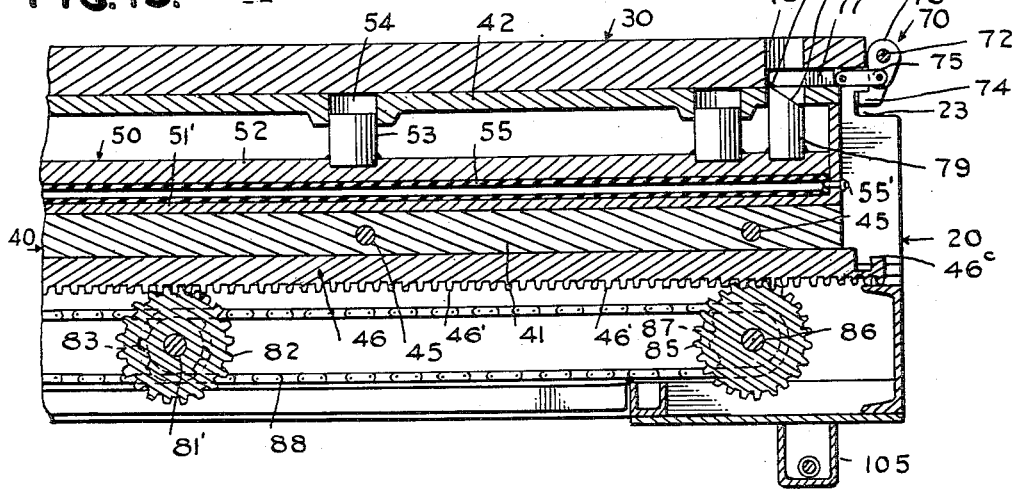
Fig. 13 is a central vertical section of the carriage of Fig. 12, showing the lock releasing means.
Figure 17:
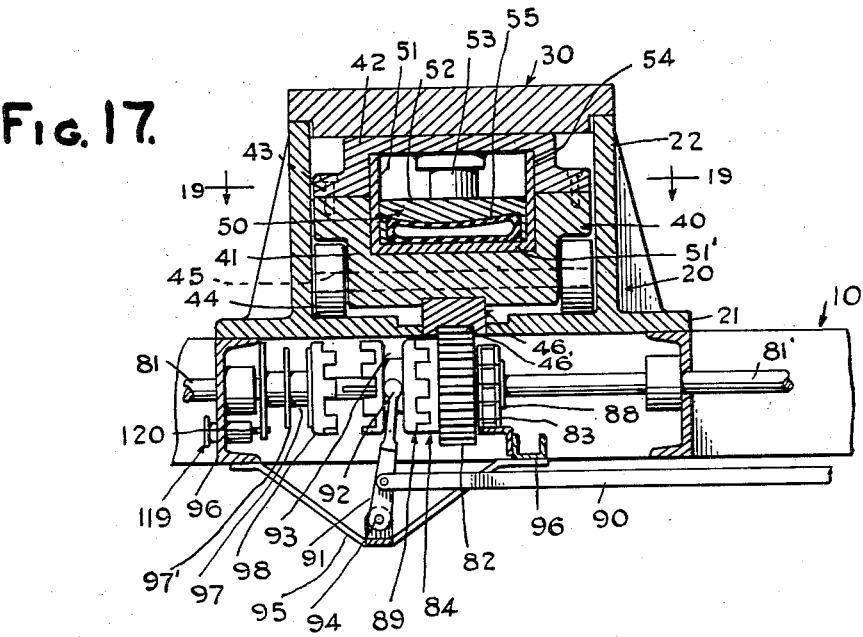
Fig. 17 is a sectional view on line 17—17 of Fig. 12.

The jack mechanisms, for the upper load supporting members 30, designated generally by numeral 50, are shown in Figs. 13, 15, and 17. Referring to these figures, the devices severally comprise an open-topped trough shaped piston casing 51, positioned in the tunnel-like opening formed by the main central recessed portions of the top and bottom members of the dolly, pistons 52, with superjoined piston rods 53, seated in registering openings 54, formed in the top member 42. The bottom of the piston is recessed lengthwise thereof, the recessed portion defining with the bottom 51' of the piston casing 51, a housing for an inflatable member 55, in the form of an elongated rubber tube, closed at both ends, one end of the tube being provided with a valved fitting 55', adapted for connection to a suitable source, not shown, of air or fluid used to inflate the tube. It is contemplated that the compressed air supply of the trailer truck will be used to inflate the tubes, however, a separate source of air or other fluid medium may be provided, if desired.

By reason of the construction of the jack arrangement 50, the weight of each piston causes it to normally rest on the bottom 51' of the piston casing 51, the tube 55 being collapsed, and the upper ends of piston rods 53 being out of contact with the under surface of the load carrying member 30. In this position, members 30 are seated on the sides 22 of base member 20, the weight of members 30, together with their superposed loads, being directly and wholly borne on and by the base 20. When a pressurized actuating fluid is introduced into tube 55 to inflate the same, the pistons 52 move upwardly, forcing the piston rods through the registering openings 54 of the top members 42, thereby lifting the load carrying members from seated position on the sides 22, the weight of members 30 and their superposed loads then being transferred to and borne by the dollies 40, as shown in Fig. 15.

A special feature of the present invention is the automatic interlocking of the load-bearing upper members 30 with the fixed sides 22, when members 30 are apposed thereto in mating seating engagement. Hinged hooks are provided at the ends of each member 30, as shown in Figs. 13, 14 and 15.

Figure 16:
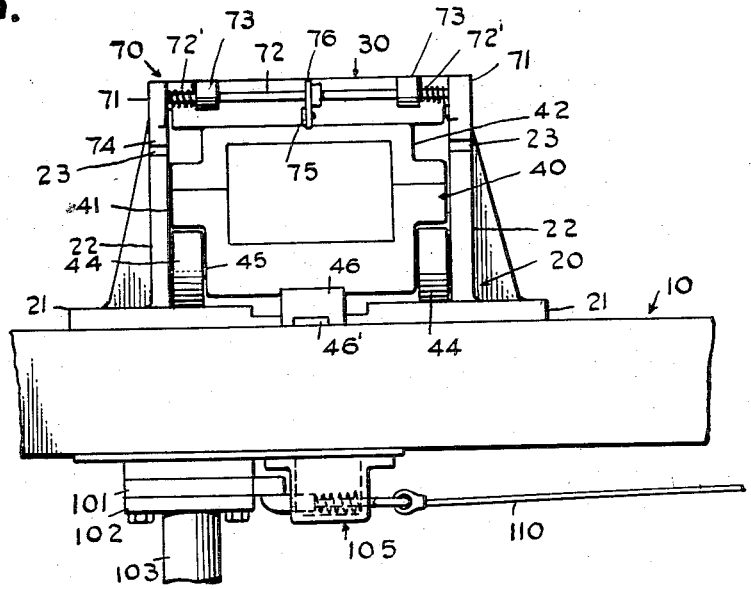
Fig. 16 is an end view of the carriage shown in Fig. 12.
Figure 18:
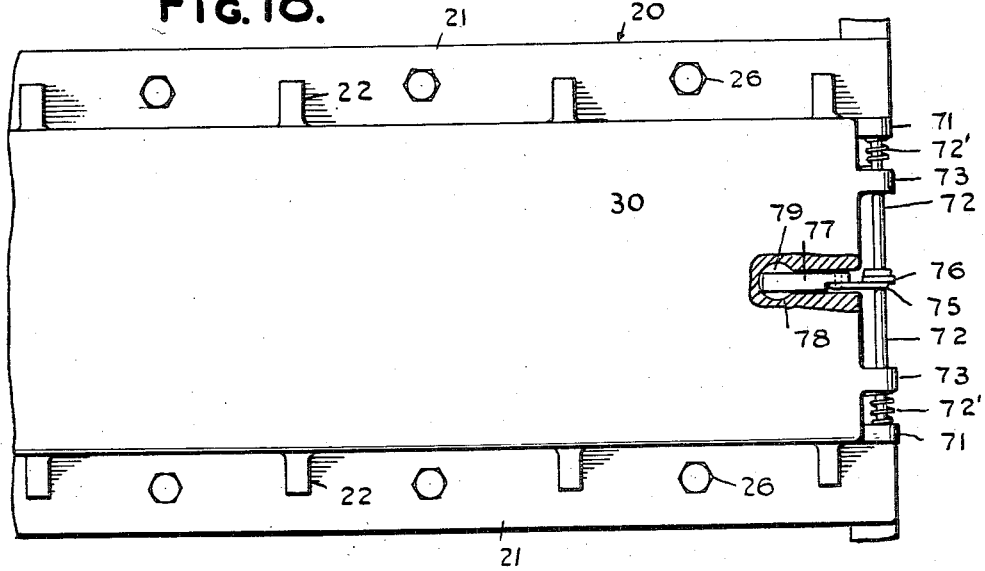
Fig. 18 is a plan view of the carriage of Fig. 12, showing the carriage lock operating means.
Figure 19:
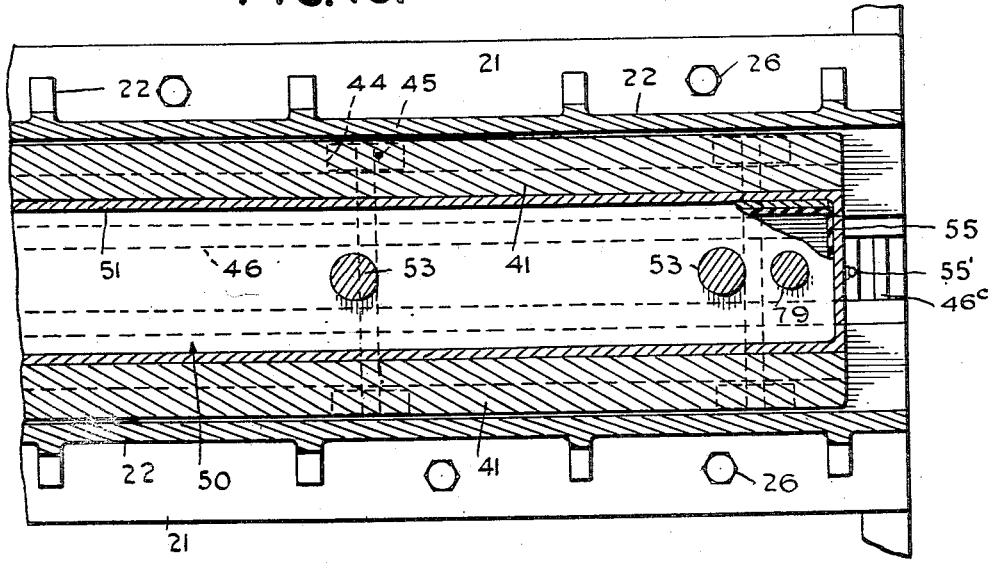
Fig. 19 is a sectional view on line 19—19 of Fig. 17.

The hinged hooks and actuating system therefor are designated generally by numeral 70, and are comprised of spaced hook members 71, fixedly mounted on a rod 72, which is journalled in spaced lugs 73 formed on the ends of members 30. The hooks have terminal sections 74, at substantially right angles to their body portions, adapted for interlocking engagement with notches 23, in the ends of the side members 22. One end of a link arm 75 is pivotally connected to members 76, fixedly secured to rod 72, Figs. 16 and 18, the opposite end of the link being pivotally connected to a member 77 adapted for sliding movement in a slot or recess formed in member 30. Member 77 is of sufficient length to project within and across a cylindrical shaped opening 78 in member 30, which opening is in register with an auxiliary piston rod 79, fixedly attached to piston 52 of the jack mechanism 50 (Fig. 13). The upper end of the piston rod 79 is tapered as at 79', and the unattached end of member 77 is formed with a complementary taper 77'. As will be seen in Figs. 16 and 18, the rod 72 is spring biased, by means of suitable springs 72', in a direction to move the hooks so that the inturned ends 74 thereof seat in the notches 23 of the side members 22.

In the operation of the above described automatic interlocking arrangement, where a dolly-supported load is to be transferred from a railroad car to a motor vehicle, or vice versa, a pressure air supply is coupled to fitting 55' through a flexible hose or the like. When air is supplied to the tube 55, pistons 52, and associated rods 53, together with auxiliary piston rods 79, move upwardly through the registering openings in member 42, pistons 53 lifting the load carrying member 30 from seated position on the sides of the fixed base of the dolly (Fig. 15). Simultaneously with, and at the beginning of the upward movement of pistons 53, piston 79 forces member 75 outwardly in the direction of the end of member 30, thus causing the spring biased rod 72 through the medium of link 75, to turn and thereby move the hooks to the unlatched position, the load 30 and associated load, supporting members then being supported on the dollies 40. In this condition, the load can be transferred, on its supporting dollies, onto another vehicle having identical sets of aligned base members 20 in register with those of the first vehicle.

When the dollies and their supported loads have been rolled into position on the transport vehicle, the pressure air is released, and the tube 55 collapses, permitting the members 30 to drop into seated bearing engagement with the sides 22 of the fixed base members 20. Simultaneously, the hooks 71 are returned to latching position under the influence of the spring biased rod 72, since auxiliary piston 79, upon collapse of the tube, moves downwardly out of control with the end portion of member 77, thus allowing this member to move inwardly of its slot.

Referring to Figs. 6–8, the means used to move the dollies to or from a trailer or railway car will now be described. As shown in these figures, an air motor designated generally by numeral 80, is mounted below the floor or deck of the trailer 10, by means of brackets or other suitable supports, not shown. The drive shaft 81 of the motor is connected to a driven shaft 81', which extends lengthwise of the trailer, having freely rotatable pinions 82, 82' and attached gears 83, 83', mounted thereon. Clutch means 84, 84' are provided for operatively connecting the pinions to the driven shaft 81'. As will be seen in Fig. 7, pairs of pinions 85, 85' are rotatably mounted on suitable shafts 86, 86' at opposite ends of the trailer, the pinions 85, 85' being in line with, and in the same plane as pinions 82, 82'. Each of pinions 85, 85' is provided with a gear 87, and a gear 87', to receive a drive chain 88, entrained with the gears 83, 83' of the main pinions 82, 82'. The movable members 89, 89' of the clutch means 84, 84' are slidably splined to the shaft 81', movement of these members being affected by means of actuating rods 90, 90' pivotally attached to members 91, having ends 92 seated in the grooved portions 93 of the movable members, the opposite ends of members 91 being pivotally attached as at 94 (Fig. 17) to a suitable support 95, carried by the transverse struts 96 of the trailer. A reel member 97, with a divider plate 97' is mounted for free rotation on shaft 81', the reel having a clutch engaging member 98 adapted for engagement with the movable member of the clutch, when it is desired to lift the jacks of the vehicle levelling arrangement, as will be described hereinafter.

From the above description of the dolly transfer means, it will be seen that when the elongated dollies are in nested position within the side walls 22 of the fixed bases 20 carried by the trailer, the pinions 82, 85 and 82, 85', are then in mesh with the teeth 46' of racks 46, positioned at the bottom of each dolly. When the clutch means 84, 84' are actuated, so as to drive the pinions in a direction to move the dollies outwardly from between the side walls 22, the dollies travel across the floor or deck of the trailer, and are received between the side walls 22 of the juxtaposed bases 20 carried by the railroad car.

As indicated hereinabove, when the racks 46 clear the last pinions, the rear portions of the dollies slightly overhang the edge of the trailer adjacent the railroad car. In order to complete the movement of the dollies to their final loaded position on the railway car, auxiliary racks are provided. Referring to Figs. 3 and 4, the auxiliary racks 46a are recessed and formed with a hook portion 46b adapted to engage with a complementary recessed portion and hook 46c, formed in the end of the main rack 46. In use, when the racks 46 of the dollies clear the last pinions, that is to say, pinions 85, 85' of either set (Fig. 7), the short rack members 46a are interlocked with the end portions of main racks 46 as shown in Fig. 4, and upon rotation of the pinions the dollies are moved to fully loaded position on the railway car. In like fashion, when it is desired to move the dollies from loaded position on the car, initial movement of the dollies to a position where the main racks 46 engage with the first set of pinions, is accomplished by means of the auxiliary racks. It will be understood that the rack extensions are normally coupled to the main racks, and that, after use, they are removed and stored in a convenient place on the trailer.

The system herein is especially adapted for the direct rolling transfer of containers and oversize loads from a trailer truck, or the like, to a railroad car, a necessary condition of such type of transfer, as herein contemplated, being the alignment, at a common level, of the fixed base supporting members. A second condition is that the car and truck shall be abutted and interlocked during such transfer. The alignment, at a common level, is preferably attained by providing the road vehicle, trailer truck, or the like, with hinged jacks operable to raise the level of the floor of a vehicle up to that of a railroad car, since railroad cars usually ride higher than road vehicles. The interlocking is accomplished by providing fitments on the railroad cars adapted to be engaged and interlocked by and with the cap plates of the hinged jacks of the road vehicles.

The railway car is provided with rearwardly tapered, depending locking pins 100 (Fig. 3) attached to the under surfaces of fixed base members 20, in the vicinity of the ends thereof, the pins being constructed and arranged to seat in suitable openings in pivotally mounted plates 101, attached to heads 102, of spindles 103, of jacks 104 (Fig. 12), carried by the trailer. Referring to Figs. 7 and 12, the jacks are shown in the up or non-load supporting position. When the jacks have bearing engagement with the ground, the apertures in the hinged plates 101 are fitted over the cooperating pins 100, and as the plates are raised by elevation of the jack pistons, the apertures are progressively engaged with the flaring taper of the pins, pulling the plates, and the trailer or other vehicle to which they are attached, into abutting relation with and against the side of the railway car. When the plates are fully engaged with the pins, they are locked in place by latch members 105, secured to the under side of the vehicle framing immediately adjacent each plate.

The jacks 104, are of the screw spindle type, adapted to be driven by air motors, designated generally by the numeral 106. The sheaves or reel members 97, referred to hereinbefore (Fig. 17), one being provided for each jack, have cables 107 wound thereon, and are fixedly connected to lugs or pins 108 located on the jack housings near the bottom thereof (Fig. 12). By means of this arrangement, the jacks can drop, of their own weight, about the hinges 101' of plates 101, and the bearing plates are latched by members 105, after the jack spindles 103 have been raised by the air motors 106. The air motors are coupled to a suitable air supply by means of flexible couplings, not shown. When the jacks are to be retracted, the latches 105 are withdrawn from their locking engagement with hinged bearing plates 101, the air motors 106 are reversed, seating the spindles in their housings and pulling the latter up on the spindles, and air motor 80 is actuated to drive the shaft 81', the movable members 89, 89' of the clutch means 85, 85' being shifted into engagement with the clutching members 98 associated with the reels 97, whereby the cables 107 are wound up on the reels, and the jacks are retracted up under the floor of the trailer.

In order to facilitate the unlatching of members 105, operating handles 109 are disposed on opposite sides of the truck, and interconnected through cables or link arms 110 and 111, the individual latches being directly connected to the handles by means of the cables or arms 110 (Fig. 7).

The clutch operating means comprises a rotatable shaft 112 (Figs. 7–9) extending transversely of the trailer, and supported on the underside of the trailer frame by hangers 113, secured to the frame by bolts 114, or other suitable fastening means. Intermediate of its hanger supported ends the shaft 112 is provided with a cam device, designated generally by numeral 115, whereby upon rotation of the shaft, rods 90, 90', operatively connected to the movable members 89, 89' of the clutch means 85, 85', are shifted, depending upon the direction of rotation of the shaft, into or out of engagement with the main pinion gears 82, 82' of the dolly transfer means, or into or out of engagement with clutching member 98 of reels 97, of the jack lifting means. As will be seen in Figs. 8 and 10, the looped ends 116, 116' of rods 90, 90' seat on the cam members 117, 117' attached to the transverse shaft 112, and that the end portions of the shaft beyond the hangers are provided with socket members 118, adapted to receive the end of a crank or other tool, not shown, used to turn the shaft 112 and effect desired clutching between driven shaft 81' and the pinions of the dolly transfer arrangement or between shaft 81' and the reels of the jack lifting mechanism. In order to prevent the reels 97 from unwinding, after the jacks are brought to their retracted positions, spring biased pin devices 119 are provided. The pin devices (Fig. 17) may be mounted on the transverse struts of the trailer, as shown, the ends of the pins 120, being adapted to seat in openings formed in the peripheral portions of the flanges of the reels.

Referring to Figs. 20–30, there is shown a modified rack arrangement for the dollies, wherein the rack members may be extended outwardly from their normally seated, fixed positions in the body portions of the dollies, in order to transfer the dollies to complete loaded position from the trailer to the railroad car, or from the car to the trailer, thus eliminating the use of the short rack members, as described hereinabove.

Figure 20:
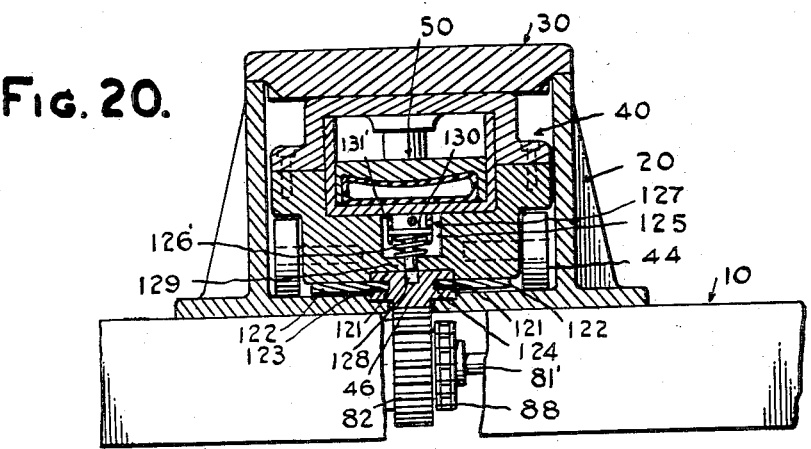
Fig. 20 is a sectional view similar to Fig. 17, of a carriage having a modified rack arrangement.

In the modified rack construction, the bottom portions of the lower members 41 of each dolly is formed with a longitudinal slot 121, adapted to receive a rack 46 in sliding engagement therewith. The rack is supported for sliding movement with respect to the slot by means of members 122, in the form of flat strips of sheet metal, welded or otherwise secured to the bottom of the dolly, the unattached portions 123 of these members being seated in longitudinal grooves 124 formed in the sides of the rack (Fig. 20). The lower member of each dolly is formed with a longitudinal passage 125 to accommodate pins 126, and the actuating means therefor, designated generally by numeral 127. The upper surface of the rack is formed with recesses 128 to receive the ends of the pins 126, whereby the rack is locked against outward movement when the dolly is being transferred from the trailer to the railroad car, or vice versa.

Figure 22:
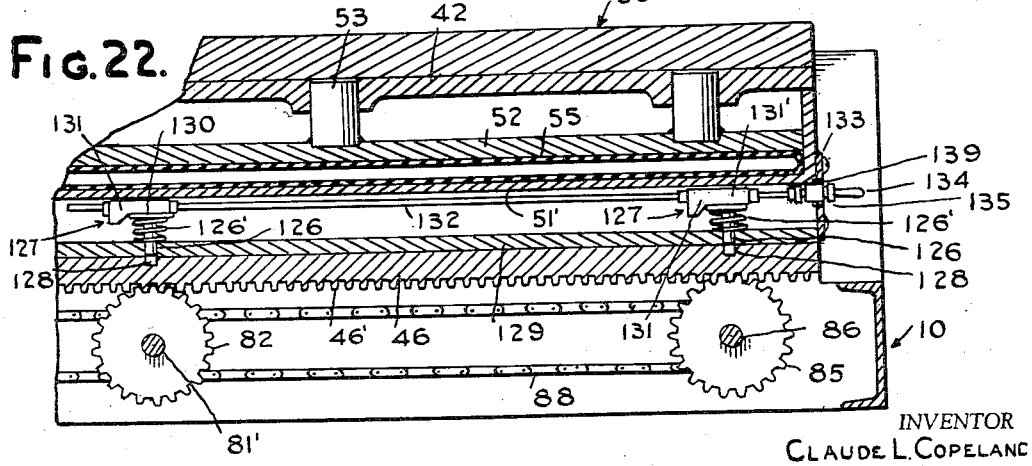
Fig. 22 is a vertical sectional view of a carriage, showing the rack and release means therefor.

As will be seen in Figs. 20 and 22, the pins are biased upwardly by means of springs 126', positioned around the pins and between the bottom member 129 of the passage 125, and the heads 130 of the pins. Actuation of the pins to seated position in the recesses 128 of the rack is effected by means of cam members 131 secured to a rod 132, mounted for reciprocation within the passage 125. The ends of the rods extending through plate members 133, attached to the ends of the lower member of the dolly, are provided with handles or grip members 134, whereby the rod may be pulled outwardly to seat the pins in recesses 128.

Figure 21:
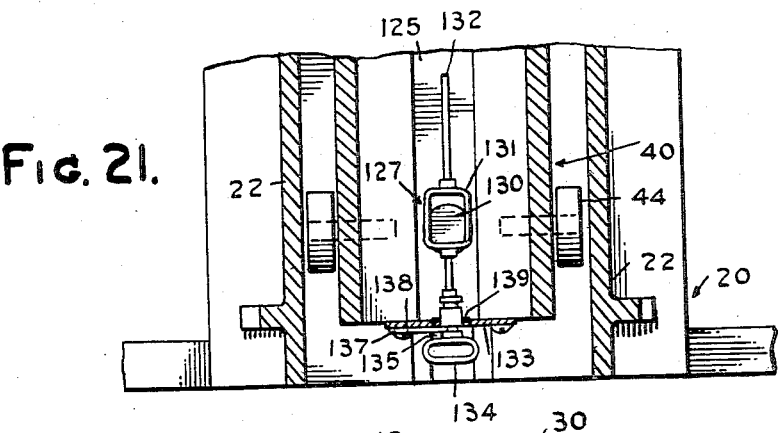
Fig. 21 is a detail view of the rack release means.
Figure 23:
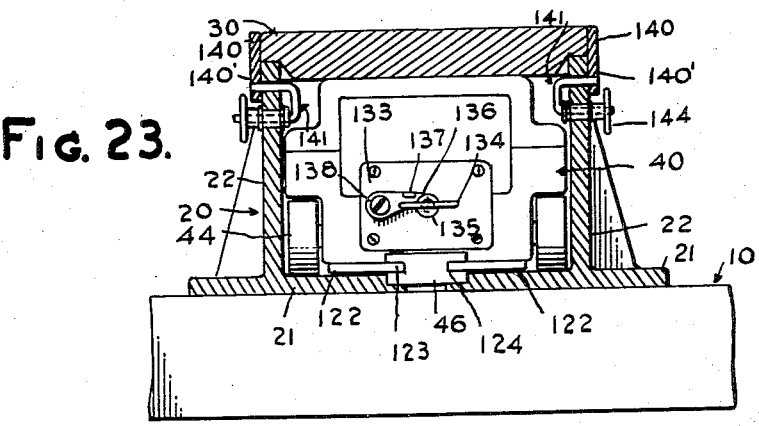
Fig. 23 is a sectional end view of the carriage rails of the railway car, showing the held-down means for the load supporting member.

Referring to Figs 21 and 23, it will be noted that the end portions of the rod 132, in the vicinity of the handles are provided with grooved fittings 135, fixedly attached to the rod, the grooves of said fittings being adapted to receive the hook ends 136, of hook members 137 pivotally mounted as at 138, on the plates 133. Suitable bushings 139 in the plates are of a diameter slightly greater than the grooved fittings so that the innermost fittings can pass freely through the bushings when the rod is pulled outwardly to lock the rack against longitudinal movement with respect to the dolly. As shown in Fig. 20, the cam members 131 are formed with downwardly extending sides or skirted portions 131' which fit over the heads 130 of the pins, and maintain the cams in alignment with the pins. It is contemplated that each dolly will be provided with three spring biased pins, one pin in the vicinity of each end of the dolly, and another intermediate of the end pins.

In the operation of the above described rack mechanism, when the dollies are being transferred from a trailer to a railway car, or vice versa, the racks are locked against longitudinal movement with respect to the dollies. To effect this required locking, one of the handle members 134 attached to rod 132 is pulled outwardly of the front plate 131, after first releasing the hook 137 from seated position in the grooved fitting 135 (Fig. 21), thus causing the cam members 131 attached to rod 132 to contact the heads 130 of the pins, and force the pins downwardly against the tension of springs 126' into seated position in recesses 128 of the rack. The rack is then locked to the lower member of the dolly, and when pinions 82, 85 and 82', 85' are rotated, the dolly is driven in the direction of the car, assuming that the direction of rotation of the pinions is for the purpose of transferring the dolly from the trailer to the car. As described in connection with the fixed rack arrangement, before the load carrying dolly is entirely clear of the trailer, the rack will have moved out of contact with the last set of pinion, and just before this point in the travel of the dolly is reached, the rack must be extended or projected a sufficient distance for continued engagement with the rack driving pinions. The rack is extended in the following manner: The hook member 137 is released from the grooved fitting 135, and handle 134 is pushed inwardly to move the cam members 131 out of contact with the heads 130 of pins 126, thus permitting the spring biased pins to move upwardly out of the recesses 128 of the rack. After the pins have been unseated, the rack is free to move with respect to the base of the dolly, and accordingly, when the pinion drive mechanism is actuated to drive the pinions in a reverse direction, that is to say, in a direction opposite to their rotation when transporting the dolly to the car, the rack is pulled outwardly from the base of the dolly. Since the pins 126 and their registering recesses 128 are equispaced with respect to the length of the rack, the middle pin and the pin near the handle end of rod 132 will seat in recesses 128, thus locking the rack against further outward movement. The direction of rotation of the pinions is then reversed, and the dolly is moved to complete loaded position on the railway car.

Referring to Fig. 27, load carrying dolly is shown in position for transfer from the trailer to the car. The rack is then in mesh with the pinions and locked against outward movement, to the base of the dolly by means of the pins. As shown in Fig. 28, the dolly has reached the point, in its travel in the direction of the car, at which the rack was extended, and Fig. 29 shows the dolly in loaded position on the car.

After the load is supported on the side rails 22 of the member 20, which is affixed to the railway car, the dolly is removed from between said members, by reversing the procedure above described, in connection with the transfer of the loaded dolly to the car.

Figure 24:
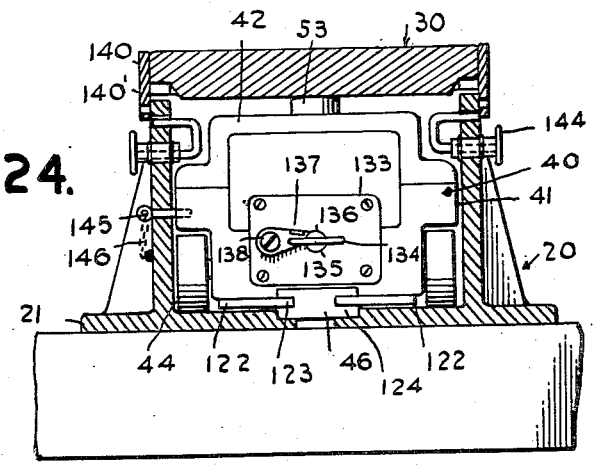
Fig. 24 is a view similar to Fig. 23, showing the held-down means in released position.
Figure 25:
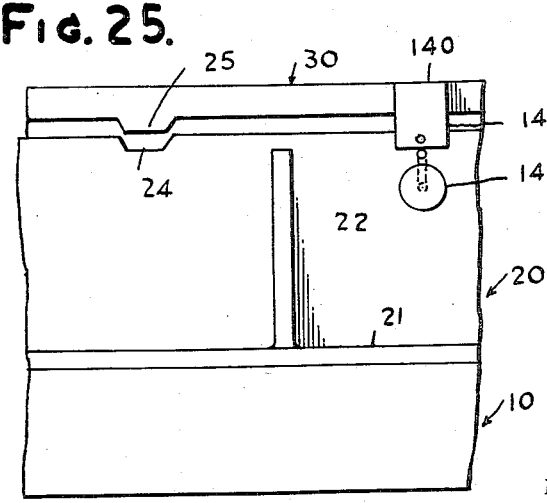
Fig. 25 is a detail side view of the held-down means shown in Fig. 24.
Figure 26:
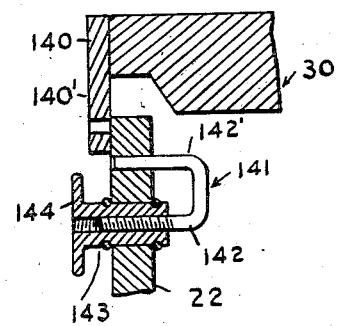
Fig. 26 is an enlarged sectional view of the hold means.

In order to restrain the upper load carrying members 30 from vertical movement with respect to their fixed supports on the railroad car, suitable hold-down means, Figs. 23–26, are provided. Referring to Fig. 23, each member 30 is provided with pieces of sheet metal 140, welded or otherwise secured to the sides thereof, the depending portions 140' of the metal pieces adjacent the side walls 22, being provided with apertures adapted to register with apertures formed in members 22. A U-shaped hook member, designated generally by numeral 141, has one leg 142 in threaded engagement with a thimble or sleeve 143, rotatably mounted in the side wall 22, the sleeve having a head portion 144, whereby the sleeve may be manually rotated. The upper leg 142' of the hook is arranged so as to seat in the registering apertures of the top member 30 and side walls 22, when said member is supported on the side walls, as shown in Fig. 23. When the load is to be supported on the dolly for transfer to or from a railway car or trailer, the hook end of each of the hold-downs is removed from seated position in the aperture of the piece 140, by turning the sleeve 143 in a direction to cause the threaded leg 144 to back out of the sleeve, thus moving the end of upper leg 142' out of the opening in the metal strip 140. In Fig. 24, the hold-downs are shown in released position, with the load supported entirely on the dolly.

In some instances, it may be found desirable to lock the dolly against movement outwardly of the side members of the fixed supports on the trailer or on the car, for example, if the dollies are left on the car, or when the racks are being extended. To restrain the dollies against such movement, suitable pins 145 (Fig. 24) are provided. The pins, as shown, extend through apertures in side members 22, with the ends thereof seated in recesses formed in the lower member of the dolly. To prevent loss or misplacement of the pins, they may be secured to the side member by a chain 146, or other suitable fastening means.

It will be appreciated that, in accordance with the novel system of the present invention for loading and unloading freight containers, loads of various types may be readily transferred from carrier vehicles to railroad cars, and vice versa. The transfer carriages or dollies are readily available at all times, since it is contemplated that after the load has been moved from the carrier vehicle to the railroad car, or from the railroad car to the carrier vehicle, and the load is supported on and by the lower rails, the dollies remain within the opening formed between the sides of the lower rails. Accordingly, when it is desired to transfer the load, it is only necessary to actuate the load jack to bring the load in bearing engagement with the dollies.

Additionally, by reason of the novel aligning arrangement of the present invention, the car and carrier floors or platforms are quickly and easily brought into the same, or substantially the same, plane, with the bottom rails in register, whereby the sides of the rails form a clear, uninterrupted passage for the transfer carriages or dollies.

In connection with the power means for moving loads to or from the car or carrier vehicle, it will be appreciated that in lieu of racks and associated driving pinions, as shown, that other means may be provided, for example, a motor driven belt having a hook or other member to engage the load to move the same from the carrier, and a similar hook on the lower run of the belt to move the load on to the carrier.

It is also contemplated that the improvements of the present invention, may be incorporated in miniature or toy loading systems, for example, in lieu of pneumatic means, the load may be raised by electro-magnetic lift devices, in which case a pair of spaced copper strips, located on a suitable support near the loading platform, would be used to supply current to the magnetic lift devices through suitable brush means. The electric motor used to drive the dolly carriages would receive its current from a second pair of copper strips, by means of brushes associated with the carriages, control of lifts and dolly driving motors being effected by separate electric switching apparatus.

To recapitulate the patentably novel features of the present invention, it will be noted that truck trailer bodies are adapted for transportation on flat cars, thereby eliminating the dead weight, non-pay load chassis structures of the usual truck trailers. The elimination of the chassis structures from the flat car loads, lowers the center of gravity of such loads and makes for smoother riding by reason of the reduction or elimination of lateral and frontal load play which is characteristic of top-heavy load structures even including standard freight cars. Additionally, by forming each truck trailer body as a demountable unit with multiple, transverse subjoined supporting beams, the necessity for special transverse support members for truck trailer chassis and flat cars is eliminated. Each truck trailer chassis and flat car fixedly mounts cooperating transverse supporting rails adapted for interfitting, cooperative engagement with superposed truck trailer bodies, and the latter are provided with multiple spring-actuated hinge-hooks adapted for engagement with the said supporting rails, whereby the truck bodies are self-secured on trailers or flat cars, and without requiring extraneous tie-downs, such as chains, lashings, cleats, or any other securing means whatever.

The improvements of the present invention not only comprehend the use of demountable truck trailer bodies on truck trailer and flat cars and in self-locking relation thereon and therewith, but also, and importantly, a novel method and means of self-contained transfer of trailer bodies from trucks to flat cars, and vice-versa. The transfer means includes elongated dollies subjacent and coupled to each trailer body supporting beam, and serving to carry a trailer body from one transportation unit to another, the dollies rolling in the aligned supporting channels of juxtaposed trailers and flat cars. To activate the dollies to trailer body-transfer condition, the subjacent supporting beams are lifted by means of air-lift jacks associated with the dollies, the jacks, when lifted, raising the beams up out of normal, seating engagement with the fixed supporting channels of the truck trailer, or flat car, as the case may be, and transferring the beam-supported load (trailer body) onto the subjoined dollies. To insure positive alignment between cooperating fixed channels of juxtaposed railway cars and truck trailers, the latter are provided with lift jacks having heads mounted on hinged bearing plates having apertured extensions adapted to underlie and lockingly engage locating and locking pins mounted on the flat cars. The hinged jacks are normally retracted up under the truck trailers.

In lieu of providing railway cars having floors, the flooring may be eliminated, and the bottom rails of the container transfer arrangement of the present invention attached directly to the side and/or under framing of the cars. In other words, the railway car would then be in the nature of a two-part car, that is, an under frame part with spaced rails, and a removable container part.

In connection with the incorporation of the improvements of the present invention in a toy loading system, referred to hereinabove, since the weight of the individual components, i. e., truck-trailer, railway car and loaded dollies is comparatively small, spring supports between the chassis and running gear of the car or trailer are not required, and accordingly, the levelling jacks, and other elements of the levelling system can be eliminated. For movement of loads from a trailer to a railway car, or vice versa, endless belts may be used, for example, a motor operated belt associated with each unit. The load would then be frictionally supported on the upper run of the belt, and after transfer to desired loaded position, the load, being restrained against further movement, as by a suitable stop member, could slip with respect to the belt.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

What is claimed:

1. In a transportation system of the character described, including a truck trailer and a railway flat car, a truck trailer body adapted for interlocking engagement with and selective transfer to and from the truck trailer to the railway flat car, and vice versa, said truck trailer body fixedly mounting a plurality of parallel spaced, subjoined transverse supporting members, a plurality of parallel, spaced channel shaped rails affixed to and athwart the car, and a like number of said rails affixed to and athwart the trailer, the sides and bottom of each channel shaped rail forming dolly receiving housings, the side members of the rails providing supports for the subjoined transverse members of the trailer body, a roll-away dolly positioned in each of said housings of one of the vehicles, each dolly having airlift means incorporated therein, the air-lift being operable to raise the transverse support members of the trailer body from seated position on the rails, whereby the body can be rolled to a desired position on and over the fixed rails of the second vehicle, the dolly then being housed within the rails of said second vehicle, means mounted on the truck-trailer to drive the dolly, and means fixedly attached to each dolly and in engagement with said dolly drive means.

2. In a transportation system of the character described, including a truck trailer and a railway flat car, a truck trailer body adapted for interlocking engagement with and selective transfer to and from the truck trailer to the railway flat car, and vice versa, said truck trailer body fixedly mounting a plurality of parallel spaced, subjoined transverse supporting members, a plurality of parallel, spaced channel shaped rails affixed to and athwart the car, and a like number of said rails affixed to and athwart the trailer, the sides and bottom of each channel shaped rail forming dolly receiving housings, the side members of the rails providing supports for the subjoined transverse members of the trailer body, said transverse members severally incorporating spring biased hold-downs at both ends thereof, the hold-downs being engageable with the side members of the fixed rails, a roll-away dolly positioned in each of said housings of one of the vehicles, means carried by the dolly for simultaneously actuating the hold-downs, each dolly having air-lift means incorporated therein, the air-lift being operable to raise the transverse support members of the trailer body from seated position on the rails, whereby the body can be rolled to a desired position on and over the fixed rails of the second vehicle, the dolly then being housed within the rails of said second vehicle, means mounted on the truck-trailer to drive the dolly, and means fixedly attached to each dolly and in engagement with said dolly drive means.

3. In a transportation system of the character described, including a truck trailer and a railway flat car, a truck trailer body adapted for interlocking engagement with and selective transfer to and from the truck trailer to the railway flat car, and vice versa, said truck trailer body fixedly mounting a plurality of parallel spaced, subjoined transverse supporting members, a plurality of parallel, spaced channel shaped rails affixed to and athwart the car, and a like number of said rails affixed to and athwart the trailer, the sides and bottom of each channel shaped rail forming dolly receiving housings, the side members of the rails providing supports for the subjoined transverse members of the trailer body, a roll-away dolly positioned in each of said housings of one of the vehicles, each dolly having air-lift means comprising an inflatable member incorporated therein, said member being operable, when inflated, to raise the transverse support members of the trailer body from seated position on the rails, whereby the body can be rolled to a desired position on and over the fixed rails of the second vehicle, the dolly then being housed within the rails of said second vehicle, means mounted on the truck-trailer to drive the dolly, said means comprising a plurality of pinions with common drive means therefor, and a rack member fixed to the base of each dolly adapted for meshing engagement with the pinions of the truck trailer.

4. In a transportation system of the character described, including a truck trailer and a railway flat car, a truck trailer body adapted for interlocking engagement with and selective transfer to and from the truck trailer to the railway flat car, and vice versa, said truck trailer body fixedly mounting a plurality of parallel spaced, subjoined transverse supporting members, a plurality of parallel, spaced channel shaped rails affixed to and athwart the car, and a like number of said rails affixed to and athwart the trailer, the sides and bottom of each channel shaped rail forming dolly receiving housings, the side members of the rails providing supports for the subjoined transverse members of the trailer body, a roll-away dolly positioned in each of said housings of one of the vehicles, each dolly having air-lift means incorporated therein, the air-lift being operable to raise the transverse support members of the trailer body from seated position on the rails, whereby the body can be rolled to a desired position on and over the fixed rails of the second vehicle, the dolly then being housed within the rails of said second vehicle, means mounted on the truck-trailer to drive the dolly, comprising a plurality of pinions rotatably mounted on spaced parallel shafts, means to drive the pinions, a rack fixedly attached to the base of each dolly adapted for meshing engagement with the pinions on one of the shafts, and means, comprising an auxiliary rack member adapted for connection to the fixed rack in the vicinity of one end thereof, whereby to increase the effective length of said fixed rack.

5. In a transportation system of the character described, including a truck trailer and a railway flat car, a truck trailer body adapted for interlocking engagement with and selective transfer to and from the truck trailer to the railway flat car, and vice versa, said truck trailer body fixedly mounting a plurality of parallel spaced, subjoined transverse supporting members, a plurality of parallel, spaced channel shaped rails affixed to and athwart the car, and a like number of said rails affixed to and athwart the trailer, the sides and bottom of each channel shaped rail forming dolly receiving housings, the side members of the rails providing supports for the subjoined transverse members of the trailer body, said transverse members severally incorporating spring biased hold-downs at both ends thereof, the hold-downs being engageable with the side members of the fixed rails, a roll-away dolly positioned in each of said housings of one of the vehicles, means carried by the dolly for simultaneously actuating the hold-downs, each dolly having air-lift means incorporated therein, the air-lift being operable to raise the transverse support members of the trailer body from seated position on the rails, whereby the body can be rolled to a desired position on and over the fixed rails of the second vehicle, the dolly then being housed within the rails of said second vehicle, means mounted on the truck-trailer to drive the dolly, comprising a plurality of pinions rotatably mounted on spaced parallel shafts, means to drive the pinions, a rack fixedly attached to the base of each dolly adapted for meshing engagement with the pinions on one of the shafts, and means, comprising an auxiliary rack member adapted for connection to the fixed rack in the vicinity of one end thereof, whereby to increase the effective length of said fixed rack.

6. In a transportation system of the character described, including a truck trailer and a railway flat car, a truck trailer body adapted for interlocking engagement with and selective transfer to and from the truck trailer to the railway flat car, and vice versa, said truck trailer body fixedly mounting a plurality of parallel spaced, subjoined transverse supporting members, a plurality of parallel, spaced channel shaped rails affixed to and athwart the car, and a like number of said rails affixed to and athwart the trailer, the sides and bottom of each channel shaped rail forming dolly receiving housings, the side members of the rails providing supports for the subjoined transverse members of the trailer body, a roll-away dolly positioned in each of said housings of one of the vehicles, each dolly having air-lift means comprising an inflatable member incorporated therein, said member being operable, when inflated, to raise the transverse support members of the trailer body from seated position on the rails, whereby the body can be rolled to a desired position on and over the fixed rails of the second vehicle, the dolly then being housed within the rails of said second vehicle, means mounted on the truck-trailer to drive the dolly, said means comprising a plurality of pinions with common drive means therefor, a rack member slidably mounted in the base of each dolly and adapted for meshing engagement with the pinions of the truck trailer, said rack being normally fixed against movement with respect to the dolly, and means carried by the dolly to optionally permit the rack to move outwardly of the dolly, whereby to increase the effective length of the rack.

7. A track-side car-loading system of the character described, including a railway flat car, a truck trailer, and railway tracks and juxtaposed roadway for the car and the trailer; leveling means on the trailer adapted to bring the floor of the trailer into register with the plane of the floor of the railway car, said leveling means comprising hinged jacks embodying locking elements engageable with the car, whereby to appose the trailer directly against the car, and interlocked therewith, a truck trailer body adapted for interlocking engagement with and selective transfer to and from the truck trailer to the railway flat car, and vice versa, said truck trailer body fixedly mounting a plurality of parallel spaced, subjoined transverse supporting members, a plurality of parallel, spaced channel shaped rails affixed to and athwart the car, and a like number of said rails affixed to and athwart the trailer, the sides and bottom of each channel shaped rail forming dolly receiving housings, the side members of the rails providing supports for the subjoined transverse members of the trailer body, a roll-away dolly positioned in each of said housings of one of the vehicles, each dolly having air-lift means incorporated therein, the air-lift being operable to raise the transverse support members of the trailer body from seated position on the rails, whereby the body can be rolled to a desired position on and over the fixed rails of the second vehicle, the dolly then being housed within the rails of said second vehicle, means mounted on the truck-trailer to drive the dolly, and means fixedly attached to each dolly and in engagement with said dolly drive means, 8. A track-side car-loading system of the character described, including a railway flat car, a truck trailer, and railway tracks and juxtaposed roadway for the car and the trailer; leveling means on the trailer adapted to bring the floor of the trailer into register with the plane of the floor of the railway car, said leveling means comprising hinged jacks embodying locking elements engageable with the car, whereby to appose the trailer directly against the car, and interlocked therewith, a truck trailer body adapted for interlocking engagement with and selective transfer to and from the truck trailer to the railway flat car, and vice versa, said truck trailer body fixedly mounting a plurality of parallel spaced, subjoined transverse supporting members, a plurality of parallel, spaced channel shaped rails affixed to and athwart the car, and a like number of said rails affixed to and athwart the trailer, the sides and bottom of each channel shaped rail forming dolly receiving housings, the side members of the rails providing supports for the subjoined transverse members of the trailer body, said transverse members severally incorporating spring biased hold-downs at both ends thereof, the hold-downs being engageable with the side members of the fixed rails, a roll-away dolly positioned in each of said housings of one of the vehicles, means carried by the dolly for simultaneously actuating the hold-downs, each dolly having air-lift means incorporated therein, the air-lift being operable to raise the transverse support members of the trailer body from seated position on the rails, whereby the body can be rolled to a desired position on and over the fixed rails of the second vehicle, the dolly then being housed within the rails of said second vehicle, means mounted on the truck-trailer to drive the dolly, and means fixedly attached to each dolly and in engagement with said dolly drive means.

9. A track-side car-loading system of the character described, including a railway flat car, a truck trailer, and railway tracks and juxtaposed roadway for the car and the trailer; leveling means on the trailer adapted to bring the floor of the trailer into register with the plane of the floor of the railway car, said leveling means comprising hinged jacks embodying locking elements engageable with the car, whereby to appose the trailer directly against the car, and interlocked therewith, a truck trailer body adapted for interlocking engagement with and selective transfer to and from the truck trailer to the railway flat car, and vice versa, said truck trailer body fixedly mounting a plurality of parallel spaced, subjoined transverse supporting members, a plurality of parallel, spaced channel shaped rails affixed to and arthwart the car, and a like number of said rails affixed to and arthwart the trailer, the sides and bottom of each channel shaped rail forming dolly receiving housings, the side members of the rails providing supports for the subjoined transverse members of the trailer body, a roll-away dolly positioned in each of said housings of one of the vehicles, each dolly having air-lift means comprising an inflatable member incorporated therein, said member being operable, when inflated, to raise the transverse support members of the trailer body from seated position on the rails, whereby the body can be rolled to a desired position on and over the fixed rails of the second vehicle, the dolly then being housed within the rails of said second vehicle, means mounted on the truck-trailer to drive the dolly, said means comprising a plurality of pinions with common drive means therefor, and a rack member fixed to the base of each dolly adapted for meshing engagement with the pinions of the truck trailer.

10. A track-side car-loading system of the character described, including a railway flat car, a truck trailer, and railway tracks and juxtaposed roadway for the car and the trailer; leveling means on the trailer adapted to bring the floor of the trailer into register with the plane of the floor of the railway car, said leveling means comprising hinged jacks embodying locking elements engageable with the car, whereby to appose the trailer directly against the car, and interlocked therewith, a truck trailer body adapted for interlocking engagement with and selective transfer to and from the truck trailer to the railway flat car, and vice versa, said truck trailer body fixedly mounting a plurality of parallel spaced, subjoined transverse supporting members, a plurality of parallel, spaced channel shaped rails affixed to and arthwart the car, and a like number of said rails affixed to and athwart the trailer, the sides and bottom of each channel shaped rail forming dolly receiving housings, the side members of the rails providing supports for the subjoined transverse members of the trailer body, a roll-away dolly positioned in each of said housings of one of the vehicles, each dolly having air-lift means incorporated therein, the air-lift being operable to raise the transverse support members of the trailer body from seated position on the rails, whereby the body can be rolled to a desired position on and over the fixed rails of the second vehicle, the dolly then being housed within the rails of said second vehicle, means mounted on the truck-trailer to drive the dolly, comprising a plurality of pinions rotatably mounted on spaced parallel shafts, means to drive the pinions, a rack fixedly attached to the base of each dolly adapted for meshing engagement with the pinions on one of the shafts, and means, comprising an auxiliary rack member adapted for connection to the fixed rack in the vicinity of one end thereof, whereby to increase the effective length of said fixed rack.

11. A track-side car-loading system of the character described, including a railway flat car, a truck trailer, and railway tracks and juxtaposed roadway for the car and the trailer; leveling means on the trailer adapted to bring the floor of the trailer into register with the plane of the floor of the railway car, said leveling means comprising hinged jacks embodying locking elements engageable with the car, whereby to appose the trailer directly against the car, and interlocked therewith, a truck trailer body adapted for interlocking engagement with and selective transfer to and from the truck trailer to the railway flat car, and vice versa, said truck trailer body fixedly mounting a plurality of parallel spaced, subjoined transverse supporting members, a plurality of parallel, spaced channel shaped rails affixed to and arthwart the car, and a like number of said rails affixed to and athwart the trailer, the sides and bottom of each channel shaped rail forming dolly receiving housings, the side members of the rails providing supports for the subjoined transverse members of the trailer body, said transverse members severally incorporating spring biased hold-downs at both ends thereof, the hold-downs being engageable with the side members of the fixed rails, a roll-away dolly positioned in each of said housings of one of the vehicles, means carried by the dolly for simultaneously actuating the hold-downs, each dolly having air-lift means incorporated therein, the air-lift being operable to raise the transverse support members of the trailer body from seated position on the rails, whereby the body can be rolled to a desired position on and over the fixed rails of the second vehicle, the dolly then being housed within the rails of said second vehicle, means mounted on the truck-trailer to drive the dolly, comprising a plurality of pinions rotatably mounted on spaced parallel shafts, means to drive the pinions, a rack fixedly attached to the base of each dolly adapted for meshing engagement with the pinions on one of the shafts, and means, comprising an auxiliary rack member adapted for connection to the fixed rack in the vicinity of one end thereof, whereby to increase the effective length of said fixed rack.

12. A track-side car-loading system of the character described, including a railway flat car, a truck trailer, and railway tracks and juxtaposed roadway for the car and the trailer; leveling means on the trailer adapted to bring the floor of the trailer into register with the plane of the floor of the railway car, said leveling means comprising hinged jacks embodying locking elements engageable with the car, whereby to appose the trailer directly against the car, and interlocked therewith, a truck trailer body adapted for interlocking engagement with and selective transfer to and from the truck trailer to the railway flat car, and vice versa, said truck trailer body fixedly mounting a plurality of parallel spaced, subjoined transverse supporting members, a plurality of parallel, spaced channel shaped rails affixed to and athwart the car, and a like number of said rails affixed to and athwart the trailer, the sides and bottom of each channel shaped rail forming dolly receiving housings, the side members of the rails providing supports for the subjoined transverse members of the trailer body, a roll-away dolly positioned in each of said housings of one of the vehicles, each dolly having air-lift means comprising an inflatable member incorporated therein, said member being operable, when inflated, to raise the transverse support members of the trailer body from seated position on the rails, whereby the body can be rolled to a desired position on and over the fixed rails of the second vehicle, the dolly then being housed within the rails of said second vehicle, means mounted on the truck-trailer to drive the dolly, said means comprising a plurality of pinions with common drive means therefor, a rack member slidably mounted in the base of each dolly and adapted for meshing engagement with the pinions of the truck trailer, said rack being normally fixed against movement with respect to the dolly, and means carried by the dolly to optionally permit the rack to move outwardly of the dolly, whereby to increase the effective length of the rack.

13. A truck-trailer of the character described, including, in combination, a wheeled trailer chassis and a roll-away body detachably mounted thereon, the chassis fixedly mounting a plurality of parallel spaced channel shaped rails affixed to and athwart the trailer chassis, the body being fixedly secured on a like number of subjoined transverse supporting members adapted to register and interlock with the rails and form tunnel sections therewith, the sides and bottom members of each channel shaped rail forming a dolly receiving housing, a roll-away dolly positioned in each of said housings, each dolly having air-lift means incorporated therein, the air-lift means being operable to raise the transverse supporting members of the trailer body from seated position on the rails, whereby the trailer body is solely supported on the dollies, means mounted on the truck-trailer to drive the dollies, and means fixedly attached to each dolly and in engagement with said dolly drive means.

14. A truck-trailer of the character described, including, in combination, a wheeled trailer chassis and a roll-away body detachably mounted thereon, the chassis fixedly mounting a plurality of parallel spaced channel shaped rails affixed to and athwart the trailer chassis, the body being fixedly secured on a like number of subjoined transverse supporting members adapted to register and interlock with the rails and form tunnel sections therewith, the sides and bottom members of each channel shaped rail forming a dolly receiving housing, a roll-away dolly positioned in each of said housings, each dolly having air-lift means incorporated therein, the air-lift means being operable to raise the transverse supporting members of the trailer body from seated position on the rails, whereby the trailer body is solely supported on the dollies, means mounted on the truck-trailer to drive the dolly, comprising a plurality of pinions with common drive means therefor, and a rack member fixed to the base of each dolly adapted for meshing engagement with the pinions of the truck trailer.

15. A truck-trailer of the character described, including, in combination, a wheeled trailer chassis and a roll-away body detachably mounted thereon, the chassis fixedly mounting a plurality of parallel spaced channel shaped rails affixed to and athwart the trailer chassis, the body being fixedly secured on a like number of subjoined transverse supporting members adapted to register and interlock with the rails and form tunnel sections therewith, the sides and bottom members of each channel shaped rail forming a dolly receiving housing, said transverse members severally incorporating spring biased hold-downs at both ends thereof, the hold-downs being engageable with side members of the fixed rails, a roll-away dolly positioned in each of said housings of one of the vehicles, means carried by the dolly for simultaneously actuating the hold-downs, each dolly having air-lift means incorporated therein, the air-lift being operable to raise the transverse support members of the trailer body from seated position on the rails, whereby the trailer body is solely supported on the dollies, means mounted on the truck trailer to drive the dollies, and means fixedly attached to each dolly and in engagement with said dolly drive means.

16. A truck-trailer of the character described, including, in combination, a wheeled trailer chassis and a roll-away body detachably mounted thereon, the chassis fixedly mounting a plurality of parallel spaced channel shaped rails affixed to and athwart the trailer chassis, the body being fixedly secured on a like number of subjoined transverse supporting members adapted to register and interlock with the rails and form tunnel sections therewith, the sides and bottom members of each channel shaped rail forming a dolly receiving housing, said transverse members severally incorporating spring biased hold-downs at both ends thereof, the hold-downs being engageable with side members of the fixed rails, a roll-away dolly positioned in each of said housings of one of the vehicles, means carried by the dolly for simultaneously actuating the hold-downs, each dolly having air-lift means incorporated therein, the air-lift being operable to raise the transverse support members of the trailer body from seated position on the rails, whereby the trailer body is solely supported on the dollies, means mounted on the truck trailer to drive the dolly, comprising a plurality of pinions with common drive means therefor, and a rack member fixed to the base of each dolly adapted for meshing engagement with the pinions of the truck trailer.

17. A truck-trailer of the character described, including, in combination, a wheeled trailer chassis and a roll-away body detachably mounted thereon, the chassis fixedly mounting a plurality of parallel spaced channel shaped rails affixed to and athwart the trailer chassis, the body being fixedly secured on a like number of subjoined transverse supporting members adapted to register and interlock with the rails and form tunnel sections therewith, the sides and bottom members of each channel shaped rail forming a dolly receiving housing, said transverse members severally incorporating spring biased hold-downs at both ends thereof, the hold-downs being engageable with side members of the fixed rails, a roll-away dolly positioned in each of said housings of one of the vehicles, means carried by the dolly for simultaneously actuating the hold-downs, each dolly having air-lift means incorporated therein, the air-lift being operable to raise the transverse support members of the trailer body from seated position on the rails, whereby the trailer body is solely supported on the dollies, means mounted on the truck trailer to drive the dolly, comprising a plurality of pinions rotatably mounted on spaced parallel shafts, means to drive the pinions, a rack fixedly attached to the base of each dolly adapted for meshing engagement with the pinions on one of the shafts, and means, comprising an auxiliary rack member adapted for connection to the fixed rack in the vicinity of one end thereof, whereby to increase the effective length of said fixed rack.

18. A truck-trailer of the character described, including, in combination, a wheeled trailer chassis and a roll-away body detachably mounted thereon, the chassis fixedly mounting a plurality of parallel spaced channel shaped rails affixed to and athwart the trailer chassis, the body being fixedly secured on a like number of subjoined transverse supporting members adapted to register and interlock with the rails and form tunnel sections therewith, the sides and bottom members of each channel shaped rail forming a dolly receiving housing, said transverse members severally incorporating spring biased hold-downs at both ends thereof, the hold-downs being engageable with side members of the fixed rails, a roll-away dolly positioned in each of said housings of one of the vehicles, means carried by the dolly for simultaneously actuating the hold-downs, each dolly having air-lift means incorporated therein, the air-lift being operable to raise the transverse support members of the trailer body from seated position on the rails, whereby the trailer body is solely supported on the dollies, means mounted on the truck trailer to drive the dolly, said means comprising a plurality of pinions with common drive means therefor, a rack member slidably mounted in the base of each dolly and adapted for meshing engagement with the pinions of the truck trailer, said rack being normally fixed against movement with respect to the dolly, and means carried by the dolly to optionally permit the rack to move outwardly of the dolly, whereby to increase the effective length of the rack.

19. In a transportation system of the character described, including a truck trailer and a railway flat car, a truck trailer body adapted for interlocking engagement with and selective transfer to and from the truck trailer to the railway flat car, and vice versa, said truck trailer body fixedly mounting a plurality of parallel spaced, subjoined transverse supporting members, a plurality of parallel, spaced channel shaped rails affixed to and athwart the trailer, the sides and bottom of each channel shaped rail forming dolly receiving housings, the side members of the rails providing supports for the subjoined transverse members of the trailer body, a roll-away dolly positioned in each of said housings of one of the vehicles, each dolly having air-lift means incorporated therein, the air-lift being operable to raise the transverse support members of the trailer body from seated position on the rails, whereby the body can be rolled to a desired position on and over the fixed rails of the second vehicle, the dolly then being housed within the rails of said second vehicle, means mounted on the truck-trailer to drive the dolly, and means slidably mounted in the base of each dolly, said means being in engagement with said dolly drive means and normally fixed against movement with respect to the dolly.

20. A truck-trailer of the character described, including, in combination, a wheeled trailer chassis and a roll-away body detachably mounted thereon, the chassis fixedly mounting a plurality of parallel spaced channel shaped rails affixed to and athwart the trailer chassis, the body being fixedly secured on a like number of subjoined transverse supporting members adapted to register and interlock with the rails and form tunnel sections therewith, a roll-away dolly positioned in each of said tunnel sections, each dolly having air-lift means incorporated therein, the air-lift means being operable to raise the transverse supporting members of the trailer body from seated position on the rails, whereby the trailer body is solely supported on the dollies, means mounted on the truck-trailer to drive the dollies, said means comprising a plurality of pinions with common drive means therefor, a rack member slidably mounted in the base of each dolly and adapted for meshing engagement with the pinions of the truck trailer, said rack being normally fixed against movement with respect to the dolly, and means carried by the dolly to optionally permit the rack to move outwardly of the dolly, whereby to increase the effective length of the rack.

21. A truck-trailer of the character described, including, in combination, a wheeled trailer chassis and a roll-away body detachably mounted thereon, the chassis fixedly mounting a plurality of parallel spaced channel shaped rails affixed to and athwart the trailer chassis, the body being fixedly secured on a like number of subjoined transverse supporting members adapted to register and interlock with the rails and form tunnel sections therewith, the sides and bottom members of each channel shaped rail forming a dolly receiving housing, said transverse members severally incorporating spring biased hold-downs at both ends thereof, the hold-downs being engageable with side members of the fixed rails, a roll-away dolly positioned in each of said housings of one of the vehicles, means carried by the dolly for simultaneously actuating the hold-downs, each dolly having air-lift means incorporated therein, the air-lift being operable to raise the transverse support members of the trailer body from seated position on the rails, whereby the trailer body is solely supported on the dollies, means mounted on the truck trailer to drive the dollies, said means comprising a plurality of pinions with common drive means therefor, a rack member slidably mounted in the base of each dolly and adapted for meshing engagement with the pinions of the truck trailer, said rack being normally fixed against movement with respect to the dolly, and means carried by the dolly to optionally permit the rack to move outwardly of the dolly, whereby to increase the effective length of the rack.

References Cited in the file of this patent

UNITED STATES PATENTS

| | | |
|---|---|---|
| 1,360,412 | Kirchner | Nov. 30, 1920 |
| 2,053,080 | Henricks | Sept. 1, 1936 |
| 2,117,067 | Ludington | May 10, 1938 |
| 2,165,641 | Mattox | July 11, 1939 |
| 2,168,527 | Iversen | Aug. 8, 1939 |
| 2,762,515 | Ingold | Sept. 11, 1956 |
| 2,788,193 | Sanders et al. | Apr. 9, 1957 |
| 2,828,027 | Stevenson et al. | Mar. 25, 1958 |

FOREIGN PATENTS

| | | |
|---|---|---|
| 401,533 | Italy | Jan. 22, 1943 |